United States Patent
Morelos

(10) Patent No.: US 12,162,692 B2
(45) Date of Patent: *Dec. 10, 2024

(54) CONVEYOR ASSEMBLY HAVING DYNAMIC FRAME COMPONENTS AND METHOD OF USING THE SAME

(71) Applicant: INTELLIGRATED HEADQUARTERS, LLC, Mason, OH (US)

(72) Inventor: Jesus Anselmo Morelos, Corregidora (MX)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,287

(22) Filed: Sep. 19, 2023

(65) Prior Publication Data
US 2024/0010437 A1 Jan. 11, 2024

Related U.S. Application Data

(63) Continuation of application No. 17/658,057, filed on Apr. 5, 2022, now Pat. No. 11,795,002.

(51) Int. Cl.
*B65G 21/20* (2006.01)
*B65G 21/00* (2006.01)
*B65G 21/10* (2006.01)

(52) U.S. Cl.
CPC ......... *B65G 21/2045* (2013.01); *B65G 21/00* (2013.01); *B65G 21/10* (2013.01); *B65G 2207/40* (2013.01)

(58) Field of Classification Search
CPC .... B65G 21/2045; B65G 21/12; B65G 21/14; B65G 2201/02; B65G 2207/08; B65G 2207/40; B65G 21/00; B65G 21/10
(Continued)

(56) References Cited

U.S. PATENT DOCUMENTS 3,878,936 A 4/1975 Niggemyer
6,318,545 B1 11/2001 Ross, II
(Continued)

FOREIGN PATENT DOCUMENTS

CN 208827591 U 5/2019
CN 210286063 U 4/2020

OTHER PUBLICATIONS

U.S. Appl. No. 17/658,057, filed Apr. 5, 2022, U.S. Pat. No. 11,795,002, issued.
(Continued)

*Primary Examiner* — Mark A Deuble
(74) *Attorney, Agent, or Firm* — Alston & Bird LLP

(57) ABSTRACT

Various embodiments are directed to conveyor apparatuses and methods of using the same. In various embodiments, a conveyor apparatus comprises a conveyor frame including a plurality of opposing sidewalls extending in a length direction and a bottom panel comprising a hinged configuration relative to the opposing sidewalls such that the bottom panel is configured for movement throughout a range of rotational motion between a closed position and an open position; and a bottom panel positioning assembly comprising: a mounting bracket secured to one of the opposing sidewalls; a positioning element slidably engaged relative to the mounting bracket and configurable between a nominal position and an engaged position; and a retention element configured to bias the positioning element towards the nominal position; wherein the bottom panel positioning assembly is configured to facilitate selective arrangement of the bottom panel based at least in part on an arrangement of the positioning element.

19 Claims, 4 Drawing Sheets

(58) Field of Classification Search
USPC .......................................... 198/860.3–860.4
See application file for complete search history.

(56) References Cited

U.S. PATENT DOCUMENTS

| | | | |
|---|---|---|---|
| 6,691,853 B1 | 2/2004 | Basketfield | |
| 7,284,658 B2 | 10/2007 | Wiggins et al. | |
| 8,448,803 B2 | 5/2013 | Most | |
| 8,936,147 B2 | 1/2015 | Knas et al. | |
| 11,795,002 B1 * | 10/2023 | Morelos | B65G 21/2045 |
| 2007/0295583 A1 | 12/2007 | Hall et al. | |
| 2010/0072038 A1 | 3/2010 | Swinderman | |
| 2012/0227232 A1 | 9/2012 | Jabber et al. | |
| 2014/0262700 A1 | 9/2014 | Brayman et al. | |
| 2023/0249917 A1 * | 8/2023 | Carlín | B65G 17/08 198/844.1 |

OTHER PUBLICATIONS

Non-Final Rejection Mailed on Apr. 13, 2023 for U.S. Appl. No. 17/658,057, 8 page(s).
Notice of Allowance and Fees Due (PTOL-85) Mailed on Jun. 28, 2023 for U.S. Appl. No. 17/658,057, 7 page(s).
Notice of Allowance received for U.S. Appl. No. 17/658,057, mailed on Sep. 15, 2023, 7 pages.

\* cited by examiner

CONVEYOR ASSEMBLY HAVING DYNAMIC FRAME COMPONENTS AND METHOD OF USING THE SAME

CROSS-REFERENCE TO RELATED APPLICATIONS

This application is a continuation of U.S. Non-Provisional application Ser. No. 17/658,057, entitled "CONVEYOR ASSEMBLY HAVING DYNAMIC FRAME COMPONENTS AND METHOD OF USING THE SAME" and filed on Apr. 5, 2022, which is incorporated herein by reference in its entirety.

FIELD OF THE INVENTION

Various embodiments described herein relate generally to a material handling systems for handling items, and, more particularly, to conveyor apparatuses configured to facilitate transportation of items along a conveyor surface.

BACKGROUND

Generally, in material handling environments like, but not limited to, distribution centers, warehouses, inventories, or shipping centers, a material handling system can convey, handle, sort, and organize various type of articles (e.g. items, cartons, cases, containers, shipment boxes, totes, packages, and/or the like) using one or more conveyor apparatuses. Through applied effort, ingenuity, and innovation, Applicant has solved problems relating to conveyor apparatuses by developing solutions embodied in the present disclosure, which are described in detail below.

BRIEF SUMMARY

Various embodiments are directed to a conveyor apparatus and method of using the same. In various embodiments, a conveyor apparatus may comprise A conveyor apparatus comprising: a conveyor frame embodying a structural support for a conveyor surface, the conveyor frame defining a conveyor length that extends in a length direction and comprising: a plurality of opposing sidewalls extending in the length direction, including a first sidewall defining a first lateral side of the conveyor frame; and a bottom panel comprising a hinged configuration relative to the plurality of opposing sidewalls such that the bottom panel is configured for movement throughout a range of rotational motion between a closed position and an open position; and a bottom panel positioning assembly comprising: a mounting bracket secured to the first sidewall of the conveyor frame; a positioning element slidably engaged relative to the mounting bracket and configured to move throughout a range of motion between a nominal position and an engaged position; and a retention element engaged with the positioning element and configured to bias the positioning element towards the nominal position; wherein the bottom panel positioning assembly is configured to facilitate selective control of the movement of the bottom panel between the closed position and the open position based at least in part on an arrangement of the positioning element.

In various embodiments, the bottom panel positioning assembly may be operatively connected to the bottom panel based at least in part on a panel connection element that extends between the bottom panel and the positioning element. In certain embodiments, the bottom panel positioning assembly may be configured such that the positioning element being positioned in the nominal position of the positioning element corresponds to the bottom panel being positioned in the closed position. In various embodiments, the mounting bracket may be secured to an outer surface of the first sidewall such that the positioning element is accessible for user interaction therewith via the outer surface of the first sidewall. In various embodiments, the bottom panel positioning assembly may be operatively connected to the bottom panel such that the retention element engaged with the positioning element causes the bottom panel to be biased towards the closed position. In various embodiments, the mounting bracket may comprise a positioning element track groove embodying a slot provided along the mounting bracket in an at least substantially vertical direction, the positioning element track groove being configured to receive at least a portion of the positioning element therein and at least partially restrict the range of motion of the positioning element in one or more directions. In certain embodiments, the first sidewall may comprise a sidewall groove embodying a slot provided along the first sidewall in an at least substantially vertical direction, the sidewall groove being at least substantially aligned with the positioning element track groove and configured to receive at least a portion of the positioning element therein.

In various embodiments, the positioning element may be configured for selective arrangement in the engaged position based on a user interaction with the positioning element. In certain embodiments, the user interaction may be defined by a force applied to the positioning element that is at least substantially larger than a retention element force imparted on the positioning element from the retention element. Further, in certain embodiments, upon a user disengagement of the positioning element, the positioning element is configured to return to the nominal position based at least in part on the retention element force. In various embodiments, the retention element may extend between a retention element anchor attached to the mounting bracket and the positioning element. In certain embodiments, the retention element anchor may be attached to an inner mounting bracket surface at an anchor position located above a positioning element track groove that is provided along the mounting bracket and at least partially defines the range of motion of the positioning element. In various embodiments, the retention element may be an actuator. Further, In various embodiments, the retention element may be a spring. In certain embodiments, the retention element may be configured to define a first expanded position when the positioning element is in the nominal position and a second expanded position when the positioning element arm is in the engaged position such that the positioning element is at least substantially continuously biased toward the finger guard plate based at least in part on the retention element.

In various embodiments, the bottom panel positioning assembly may comprise a locking pin, and the bottom panel positioning assembly is configured for selectively locking the positioning element in the engaged configuration based at least in part on the locking pin being inserted into a mounting bracket locking pin aperture provided in the mounting bracket and a positioning element locking pin aperture provided in the positioning element such that the positioning element is secured so as to at least partially restrict the range of relative motion between the mounting bracket and the positioning element. In various embodiments, the bottom panel may be configured for selective rotation about a lateral hinge axis defined in a lateral direction between the opposing sidewalls. In various embodiments, the bottom panel may comprise a panel attachment element secured to a lateral frame element of the bottom panel in a position that is at least substantially aligned along a vertical axis with at least a portion of the positioning element when the bottom panel is in the closed position, the panel attachment element being configured for attachment to a panel connection element of the bottom panel positioning assembly.

A bottom panel positioning assembly comprising a mounting bracket configured for attachment to a first sidewall of a conveyor assembly; a positioning element slidably engaged relative to the mounting bracket and configured to move throughout a range of motion between a nominal position and an engaged position; and a retention element engaged with the positioning element and configured to bias the positioning element towards the nominal position; wherein the bottom panel positioning assembly is configured to facilitate selective movement of a bottom panel of the conveyor assembly between a closed position and an open position based at least in part on an arrangement of the positioning element. In various embodiments, the bottom panel positioning assembly may be operatively connected to the bottom panel based at least in part on a panel connection element that extends between the bottom panel and the positioning element, and wherein the bottom panel positioning assembly is configured such that the positioning element being positioned in the nominal position of the positioning element corresponds to the bottom panel being positioned in the closed position.

BRIEF DESCRIPTION OF THE DRAWINGS

Reference will now be made to the accompanying drawings, which are not necessarily drawn to scale, and wherein.

DETAILED DESCRIPTION

Figure 1:
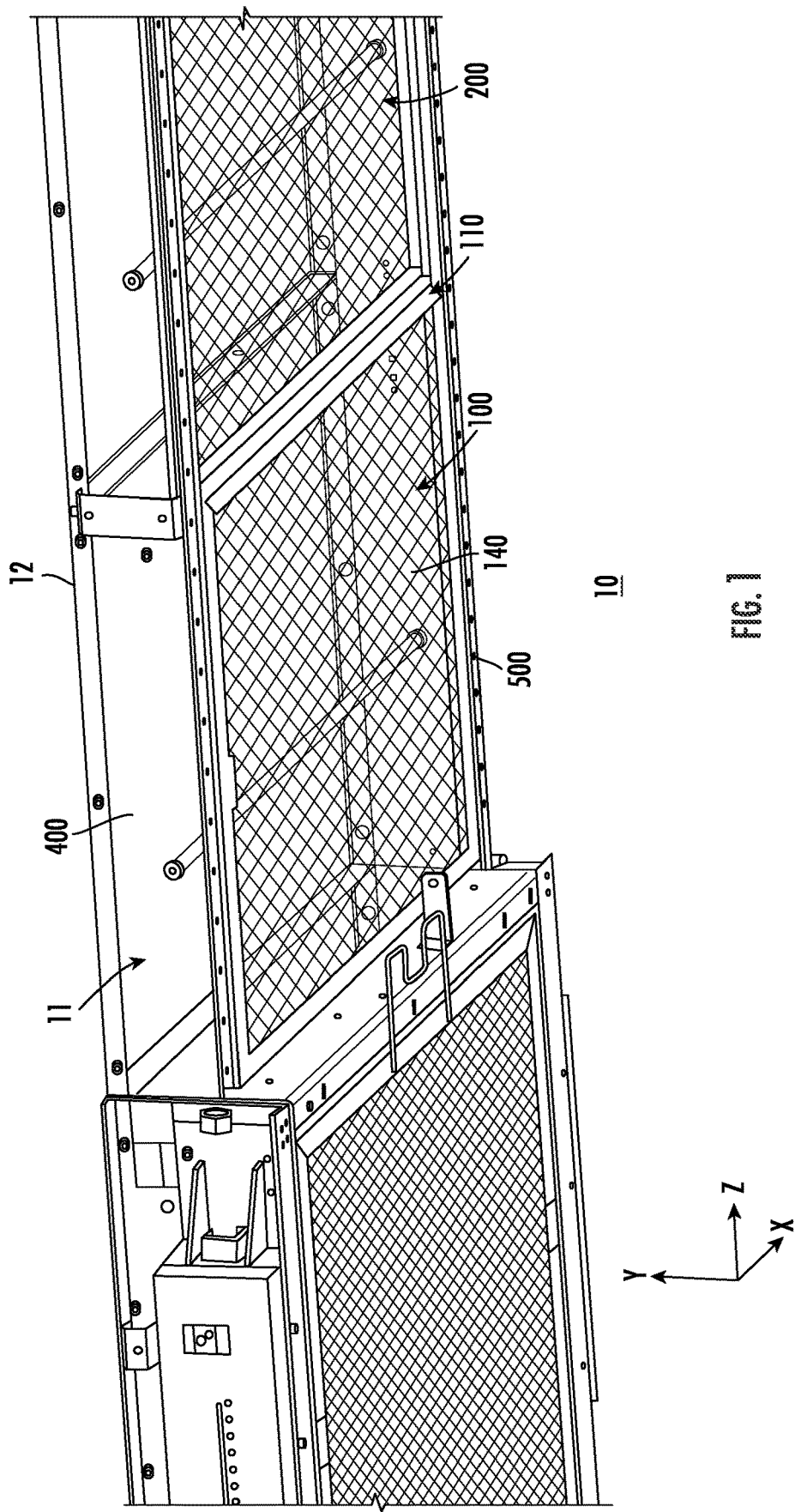
FIG. 1 illustrates a bottom perspective view of an exemplary conveyor apparatus according to an exemplary embodiment described herein.
Figure 2:
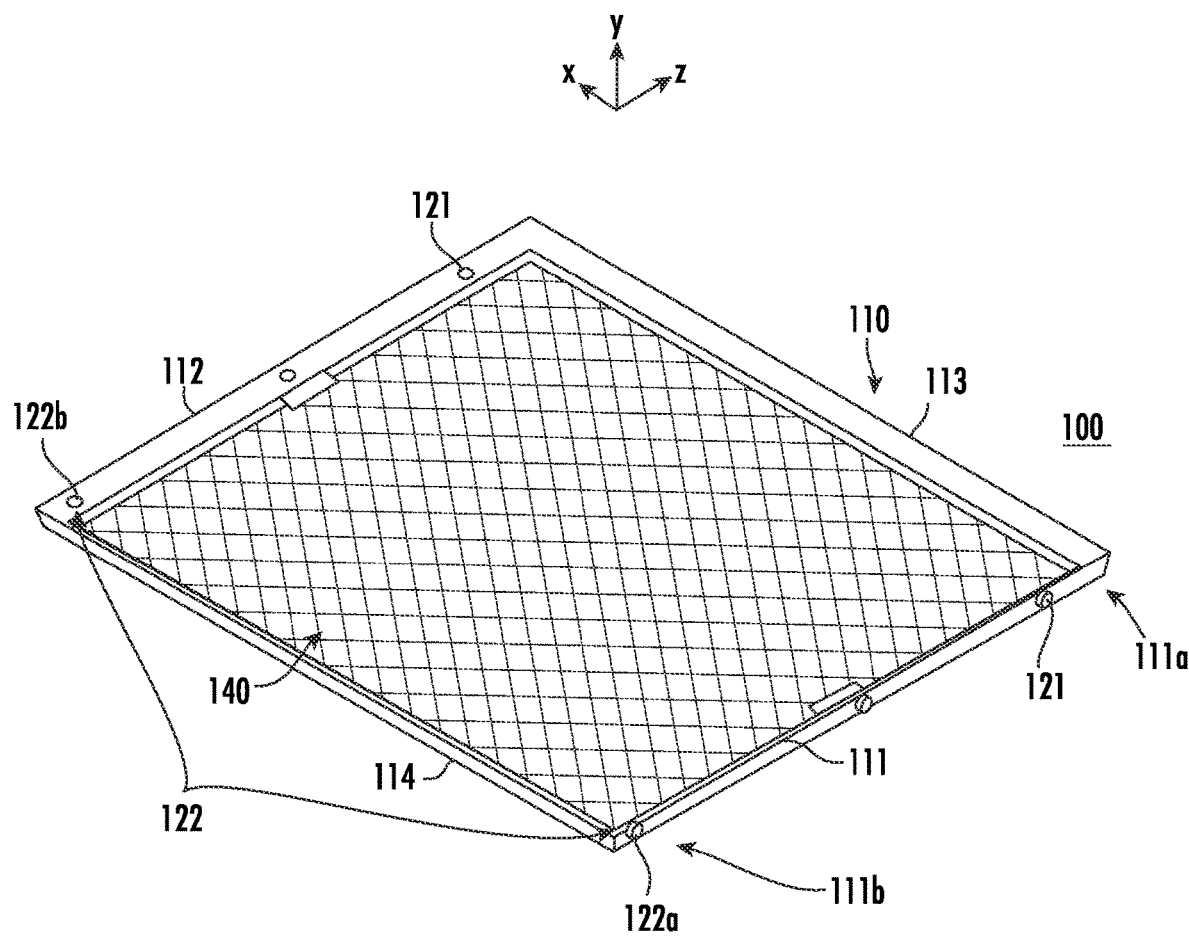
FIG. 2 illustrates a bottom perspective view of an exemplary conveyor apparatus according to an exemplary embodiment described herein

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Conveyor apparatuses may be used in, for example, industrial manufacturing and packaging applications to facilitate the transportation of objects to a desired delivery location within a factory or a warehouse. For example, conveyor apparatuses can include a conveyor surface that extends along a length of the conveyor apparatus and supports items disposed thereon as the items are transported along a conveyor travel path towards a destination location. Further, conveyor apparatuses may comprise a conveyor frame that may include various structural components such as, for example, sidewalls, panels, and/or the like that are assembled relative to one another to provide a frame capable of supporting the conveyor surface along the length of the apparatus. For example, various conveyor apparatuses can include one or more bottom panels provided along a bottom side of a conveyor assembly to prevent unauthorized and/or unintended access to a bottom side of the conveyor surface, an internal portion of the conveyor apparatus, various controls and mechanisms housed within the frame of the conveyor apparatus, and/or the like.

Various conveyor apparatuses comprise bottom panels that are configured to be fully removeable from the conveyor frame. In such conveyor apparatuses, in order to access the internal portion of the conveyor, one or more bottom panels of the conveyor frame must be fully detached (e.g., uninstalled) from the frame. For example, such configurations may require at least two people, such as, for example, maintenance or other service personnel, to fully remove the bottom panel from the frame, often requiring multiple fastening components such as pins, bolts, and/or the like positioned on each side of the conveyor frame to be removed from the frame while the bottom panel is simultaneously held in a stabilized position to prevent the bottom panel from falling to the ground below. Such an exercise of may require a large number of tools and/or personnel to be executed, and may be a time-consuming operation that results in undesirably high costs associated with labor and/or operational downtime. Further, such conveyor apparatuses may require installation hardware associated with the bottom panels that prevents the bottom panels from being pre-assembled into the conveyor frame prior to shipment. Having to assemble the bottom panels within the conveyor frame upon receipt thereof can impose additional costs associated with labor and downtime on a consumer. Further, various conveyor apparatuses bottom panels can have hinged connections relative to another component of the conveyor frame, such as, for example, a frame sidewall. Such hinged bottom panel configurations may include a variety of hinge and/or locking mechanisms that collectively may result in excessive manufacturing costs and a complex opening operation that requires an undesirably large number of actions to be executed in order for the bottom panel to be opened. For example, such conveyor apparatuses may include a plurality of locks distributed at various locations along the conveyor frame that, once disengaged, may cause the unhinged bottom panel portion to be immediately released, creating a potentially dangerous condition wherein a heavy bottom panel is freely swinging beneath an intermediate section of the conveyor frame. Those same complexities are present during the process of having to reinstall the hinged bottom panel into the conveyor frame.

Various embodiments described herein are directed to conveyor apparatuses that comprise a conveyor frame having a bottom panel that is hingedly connected to the opposing sidewalls of the conveyor assembly and configured to be selectively moveable between a closed position and an open position based at least in part on the arrangement of a bottom panel positioning assembly operatively connected thereto. An exemplary bottom panel positioning assembly may include a mounting bracket secured to the first sidewall of the conveyor frame, a positioning element slidably engaged relative to the mounting bracket and configured to move throughout a range of motion between a nominal position and an engaged position, and a retention element engaged with the positioning element and configured to bias the positioning element towards the nominal position. As described herein, the positioning element of the bottom panel positioning assembly may be configured for selective arrangement in the engaged position based on a user interaction with the positioning element, wherein defined by a force applied to the positioning element that is at least substantially larger than a retention element force imparted on the positioning element from the retention element. Further, in various embodiments, the bottom panel positioning assembly may be configured such that, upon a user disengagement of the positioning element, the positioning element may return to the nominal position based at least in part on a retention element force applied thereto by the retention element. Further, in various embodiments, the bottom panel positioning assembly may include a locking pin used for selectively locking the positioning element in a fully engaged configuration by simultaneously engaging both the mounting bracket and the positioning element to restrict the range of relative motion therebetween.

As described herein, the present invention may include a bottom panel positioning assembly that is operatively connected to the bottom panel based at least in part on a panel connection element that extends between the bottom panel and the positioning element. Further, the bottom panel positioning assembly is configured such that the positioning element being positioned in the nominal position of the positioning element corresponds to the bottom panel being positioned in the closed position. For example, the bottom panel positioning assembly is configured such that the positioning element being positioned in the nominal position of the positioning element corresponds to the bottom panel being positioned in the closed position. The present invention includes a conveyor apparatus comprises bottom panel positioning assemblies configured to facilitate selective control of dynamically configured bottom panels that, as described herein, may represent a simplified bottom panel reconfiguration operation that is defined by minimized labor costs, simplified operations, and a reduction of the hazardous conditions that may be associated with accessing the internal portion of a conveyor apparatus.

A conveyor apparatus may be configured to facilitate the transportation of one or more objects along a conveyor travel path that is defined along the length of the conveyor apparatus to a desired downstream location. For example, FIG. 1 illustrates a bottom perspective view of an exemplary conveyor apparatus configured in accordance with an example embodiment. As illustrated, an exemplary conveyor assembly 10 may comprise a conveyor surface 12 extending along a length of the conveyor apparatus in a length direction (e.g., in the z-direction as illustrated in FIG. 1) and a conveyor frame 11 configured to extend along the length of the conveyor apparatus and provide structural support for the conveyor surface 12 (e.g., a plurality of rollers, a belt assembly, and/or the like) and other conveyor components so as to define a conveyor travel path thereaulong. In various embodiments, an exemplary conveyor assembly 10 may comprise a conveyor surface 12 defined by a top surface (e.g., a planar surface collectively defined by a plurality of rollers) configured to support one or more objects disposed thereon and facilitate the transportation of the one or more objects along the conveyor travel path. For example, the conveyor travel path may be defined along the length of the conveyor surface 12 of the conveyor assembly 10. In various embodiments, the conveyor surface 12 may comprise motorized drive rollers, a belt conveyor, and/or any other conveying means configured for moving an object disposed thereon along the conveyor travel path towards a destination location.

As described, in various embodiments, a conveyor assembly 10 may further comprise a conveyor frame 11 that provides structural support for the conveyor surface 12 along the length of the conveyor assembly 10 (e.g., in the z-direction as illustrated in FIG. 1). In various embodiments, a conveyor frame 11 may comprise two opposing sidewalls, such as, for example, a first sidewall 400 and a second sidewall 500 provided on opposing lateral sides of the conveyor surface 12. The first sidewall 400 and the second sidewall 500 of the conveyor frame 11 may each have a sidewall length defined in the length direction defined along the length of the conveyor assembly 10, such as, for example, in the z-direction as illustrated in FIG. 1, and a sidewall height that is defined between a top sidewall portion and a bottom sidewall portion thereof in a height direction, which may be a vertical direction at least substantially perpendicular to the length direction, such as, for example, the y-direction as illustrated in FIG. 1. In various embodiments, the first and second sidewalls 400, 500 may each be configured to receive and/or support a respective lateral side of the conveyor surface 12 (e.g., a respective lateral side of each of a plurality of rollers defining the conveyor surface 12) such that the width of conveyor surface 12 extends laterally between the respective top sidewall portions of the first and second sidewalls 400, 500. For example, the lateral width of the conveyor surface 12 may be defined in a lateral direction that is at least substantially perpendicular to the length direction, such as, for example, the x-direction as illustrated in FIG. 1.

In various embodiments, a conveyor frame 11 may further comprise at least one bottom panel 100 defining a bottom surface of the conveyor frame 11 that is configured to provide coverage over at least a portion of a bottom side of the conveyor apparatus so as to prevent unwanted (e.g., unauthorized) access to the internal portion of the conveyer apparatus (e.g., beneath the conveyor surface and in between the two opposing sidewalls of the conveyor frame) and/or the various conveyor components disposed therein. As illustrated in FIG. 1, an exemplary bottom panel 100 of a conveyor frame 11 may have a bottom panel width that extends laterally between the two opposing sidewalls 400, 500 of the conveyor frame 11. For example, the conveyor frame 11 may be arranged such that the bottom panel width of each bottom panel 100 extends laterally between respective bottom sidewall portions of the first and second sidewalls 400, 500. In various embodiments, a conveyor frame 11 of an exemplary conveyor assembly 10 may comprise a plurality of bottom panels 100, 200 arranged consecutively along the length of the conveyor apparatus such that when the conveyor frame is arranged in a closed position, as described in further detail herein, the bottom panel length of each of the plurality of bottom panels defines a respective portion of the length of the conveyor apparatus.

As described in further detail herein, at least one bottom panel 100 disposed between the opposing sidewalls 400, 500 of the conveyor frame 11 may be hingedly secured relative to the opposing sidewalls 400, 500 such that the bottom panel 100 is configured to be selectively rotated about a hinge axis embodying a lateral axis extending between the opposing sidewalls 400, 500. For example, the hinged bottom panel 100 may define a fixed end that is linearly fixed relative to the opposing sidewalls 400, 500 and a dynamic end that that is configured for movement relative to the sidewalls 400, 500 as the bottom panel 100 is rotated about the hinge axis. For example, the fixed end of the bottom panel 100 may comprise a portion of the bottom panel 100 that is at least substantially adjacent the hinge axis, such as, for example, a back end of the panel 100 as measured in the length direction, and the dynamic end of the bottom panel 100 may comprise an opposite longitudinal end of the bottom panel 100 that is at least substantially opposite the fixed end, such as, for example, a front end of the hinged bottom panel 100. As described in further detail herein, such an exemplary hinged bottom panel 100 may be configurable between a closed position in which the dynamic end of the bottom panel 100 is positioned between the opposing sidewalls 400, 500 such that the bottom panel 100 provides coverage over a corresponding portion of the bottom side of the conveyor frame, and an open position in which the dynamic end of the bottom panel 100 is positioned below the opposing sidewalls 400, 500 such that at least a portion of the bottom side of the conveyor frame corresponding to the bottom panel 100 is defined by an opening that is not covered by the bottom panel 100. As described herein, an exemplary bottom panel 100 may be configured such that, upon being selectively configured in an open position, such as, for example, in response to user engagement with a bottom panel positioning assembly 200 engaged therewith, the interior conveyor portion of the conveyor apparatus 10 may be accessed (e.g., by maintenance and/or service personnel) through the corresponding opening in the bottom side of the conveyor frame 11.

In various embodiments, an exemplary bottom panel 100 may comprise a bottom panel frame 110 that comprises one or more frame elements arranged to define an outer perimeter of the bottom panel 100. For example, as illustrated, an exemplary bottom panel frame 110 may comprise a plurality of frame elements arranged in an at least substantially rectangular configuration, including a first later side frame element 111 and a second lateral side frame element 112 defining opposing lateral sides of the bottom panel frame 110 such that a panel width of the bottom panel 100 is defined therebetween (e.g., measured perpendicularly between the first and second lateral side frame elements 111, 112 in the x-direction, as illustrated). The bottom panel 100 may be configured for positioning within a conveyor frame of an exemplary conveyor apparatus such that each of the lateral side frame elements 111, 112 may be arranged at least substantially adjacent a respective one of the opposing sidewalls of the conveyor frame. In various embodiments, as illustrated, the plurality of frame elements of the bottom panel frame 110 may further comprise a front frame element 113 extending perpendicularly between the first and second lateral side frame elements 111, 112 so as to define a front side of the bottom panel frame 110, and a rear frame element 114 extending perpendicularly between the first and second lateral side frame elements 111, 112 so as to define a rear side of the bottom panel frame 110, the rear side of the bottom panel frame 110 being opposite the front side as defined in a length direction along the first and second lateral side frame elements 111, 112 (e.g., in a y-direction, as illustrated).

Further, an exemplary bottom panel 100 may comprise a bottom panel cover 140 comprising an at least substantially planar component (e.g., a material sheet and/or the like) that embodies a physical barrier extending throughout an internal area defined within the outer perimeter of the plurality of frame elements of the bottom panel frame 110 to function to prevent unwanted (e.g., unauthorized) access to the internal portion of the conveyor apparatus via the internal area defined within the bottom panel frame 110. For example, the bottom panel cover 140 may be secured to the bottom panel frame 110 such that, upon the exemplary bottom panel 100 being installed within the conveyor apparatus between the two opposing sidewalls of the conveyor frame (e.g., via the first and second lateral side frame elements 111, 112 of the bottom panel frame 110), as described herein, the bottom panel cover 140 may provide coverage over at least a portion of the bottom side of the conveyor apparatus based at least in part on the position of the bottom panel 100 along the conveyor length. In various embodiments, an exemplary bottom panel 100 may comprise a bottom panel cover 140 defined by an at least substantially rigid material, such as, for example, a plastic material, a composite material (e.g. fiber glass, carbon fiber with resin), a metal material (e.g., an expanded metal material), a wood material, a rigid fibrous material (e.g., a recycled compacted carton material), and/or the like, or any other suitable material capable of being secured relative to a bottom panel frame and providing at least partial physical coverage over the area defined within the outer perimeter of the frame.

In various embodiments, an exemplary bottom panel may be hingedly secured relative to at least a portion of the conveyor frame (e.g., relative to the first and second opposing sidewalls of the conveyor frame) such that the bottom panel 100 is configured to rotate about a hinge axis define by a plurality of bottom panel hinges between the closed position and an open position, as described herein. For example, in various embodiments, an exemplary bottom panel 100 may comprise a plurality of bottom panel hinges 122 defining the hinged connection of the bottom panel 100 relative to the conveyor frame 11 (e.g., relative to the first and second sidewalls 400, 500). The plurality of bottom panel hinges 122 may include a first bottom panel hinge 122a arranged along the first lateral side frame element 111 and configured to engage a first sidewall of the conveyor frame adjacent thereto so as to established a hinged connection between the bottom panel 100 and the first sidewall, and a second bottom panel hinge 122b arranged along the second lateral side frame element 112 and configured to engage a second sidewall of the conveyor frame adjacent thereto so as to established a hinged connection between the bottom panel 100 and the second sidewall. As illustrated, each of the plurality of hinges bottom 122 may be positioned along a respective lateral side frame element (e.g., along one of the first or second lateral side frame elements 111, 112) at an at least substantially rear portion thereof (e.g., at a portion along the length of the respective lateral side frame element at least substantially proximate the rear frame element 114). In such an exemplary configuration, the plurality of bottom panel hinges 122 may at least substantially restrict the linear movement of a rear portion of the bottom panel 100 engaged therewith (e.g., the rear frame element 114) relative to the opposing sidewalls of the conveyor frame while enabling the bottom panel 100 to rotate about the hinge axis defined therebetween (e.g., extending in the x-direction, as illustrated) such that at least an opposing front portion of the bottom panel (e.g., the front frame element 113) may be rotationally moved relative to the opposing sidewalls of the conveyor frame between the closed position and an open position.

In various embodiments, an exemplary bottom panel 100 may further comprise one or more panel attachment elements 121 configured for coupling to at least a portion of a bottom panel positioning assembly to facilitate a connection of the bottom panel 110 to the bottom panel positioning assembly, as described herein, such that the bottom panel 110 may be configurable according to the arrangement of the bottom panel positioning assembly. For example, one or more panel attachment elements 121 may be positioned along a lateral side of the bottom panel frame 110 (e.g., the first lateral side frame element 111, the second lateral side frame element 112). An exemplary panel attachment element 121 may be fixedly secured to a lateral side frame element, such as, for example, the first lateral side frame element 111, at an at least substantially front portion thereof (e.g., at a portion along the length of the first lateral side frame element 111 at least substantially proximate the front frame element 113) and may extend in a laterally inward direction toward the opposing lateral side of the bottom panel frame 110. For example, an exemplary panel attachment element 121 may be fixedly secured to the first lateral side frame element 111 along a portion of the first lateral side frame element 111 corresponding to the dynamic end of the hinged bottom panel 100 such that the panel attachment element 121 is positioned at an opposite longitudinal end of the first lateral side frame element 111 from the first bottom panel hinge 122a of the plurality of bottom panel hinges 122. In various embodiments, an exemplary panel attachment element 121 may comprise a pin, a hook, a latch, and/or any other mechanical fastening means configured for attaching a first end of a connection element 250 (e.g., a cable, chain, rob, and/or the like) thereto in order to facilitate an operative connection between the bottom panel 100 and the bottom panel positioning assembly 200 (e.g., a slider assembly 220).

Figure 3B:
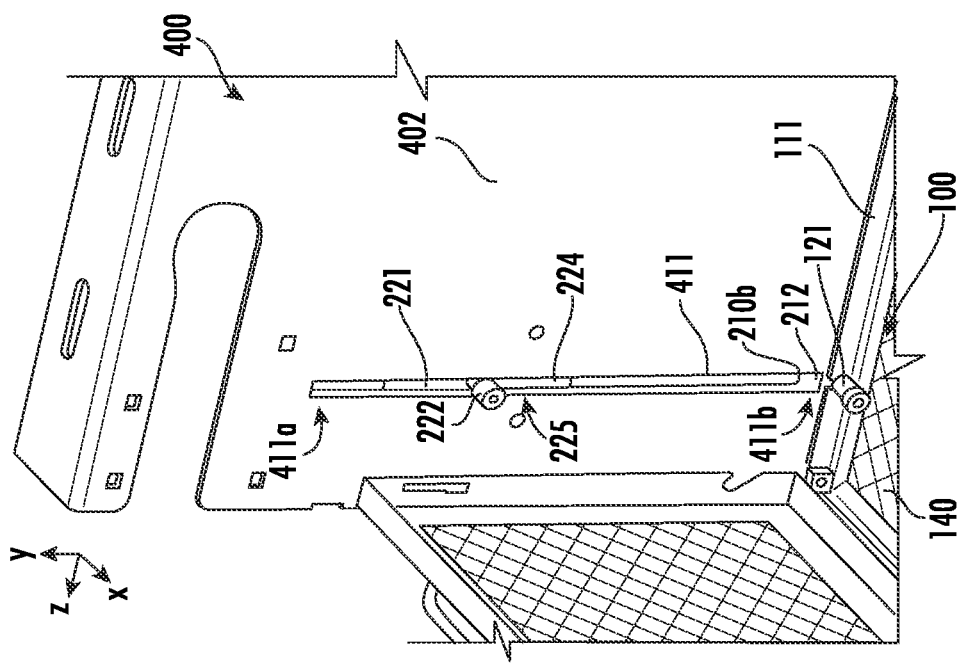
FIGS. 3A and 3B illustrate various perspective views of an exemplary conveyor apparatus according to an exemplary embodiment described herein.
Figure 3A:
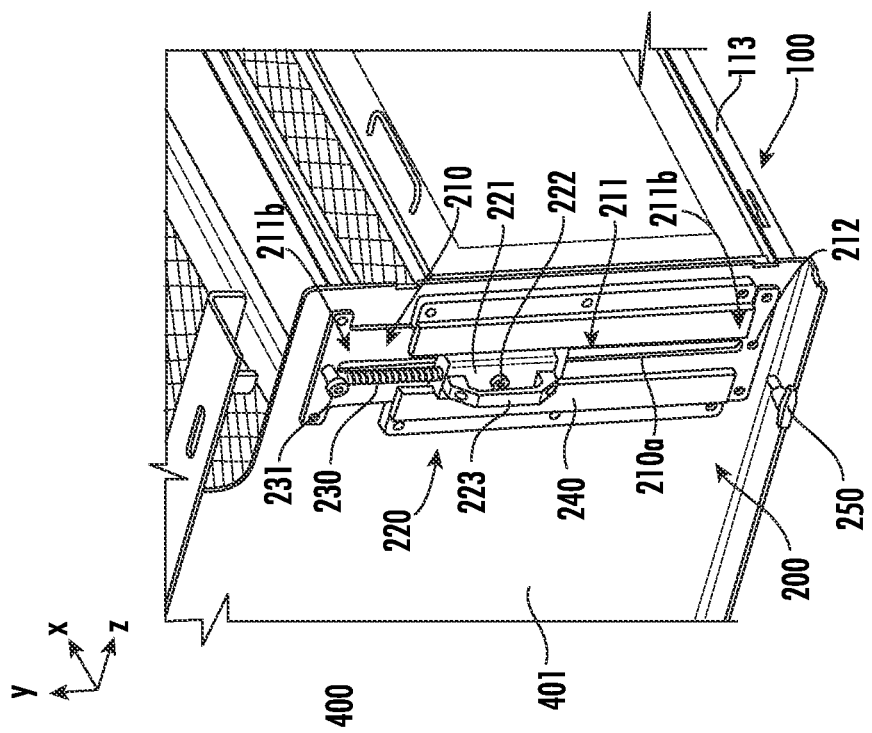

FIGS. 3A and 3B illustrate various perspective views of an exemplary conveyor apparatus according to an exemplary embodiment described herein. In particular, FIG. 3A and FIG. 3B illustrate perspective views of an exemplary bottom panel positioning assembly 200 from an exterior perspective relative to the conveyor assembly and a perspective within an interior conveyor portion of the conveyor assembly, respectively. As illustrated, an exemplary bottom panel positioning assembly 200 may comprise a mounting bracket 210, a slider assembly 220, a retention element 230, a locking pin 240, and a panel connection element 250. An exemplary bottom panel positioning assembly 200 may be positioned along an opposing sidewall of an exemplary conveyor assembly, such as, for example, along first sidewall 400. In various embodiments, an exemplary bottom panel positioning assembly 200 may be arranged along a sidewall at a position aligned with, corresponding to, and/or at least substantially adjacent a moveable end of an exemplary bottom panel that is hingedly connected at an opposing end to the conveyor frame. For example, as illustrated, in an exemplary configuration wherein a bottom panel 100 is hingedly connected to the opposing sidewalls of a conveyor frame via a plurality of bottom panel hinges 122 that define a hinge axis extending laterally across a back portion of the bottom panel 100 (e.g., adjacent and parallel to the rear frame element 114), the exemplary bottom panel positioning assembly 200 may be located along the length first sidewall 400 in a position that is at least substantially aligned with a selectively dynamic front portion of the hinged bottom panel 100. As described herein, the bottom panel positioning assembly 200 may be operatively connected to at least portion of the bottom panel 100 via a panel connection element 250, such as, for example, a wire, cable, rod, and/or the like, that is coupled on respective ends thereof to the bottom panel positioning assembly 200 and a portion of the bottom panel 100 aligned therewith (e.g., a panel attachment element 121) such that the configuration of the bottom panel 100 (e.g., between a closed position and an open position) corresponds at least in part to the configuration of the bottom panel positioning assembly 200, as described herein. For example, in various embodiments wherein the dynamic end of the hinged bottom panel 100 is not connected directly to the opposing sidewall, the connection element 300 operatively connecting the bottom panel 100 (e.g., the dynamic front end of the bottom panel 100) to the bottom panel positioning assembly 200 may function to control the position of the hinged bottom panel 100 about its range of rotational motion (e.g., between the closed position and an open position) by counteracting the gravitational forces acting in order to facilitate the retention of the bottom panel 100 in a closed position and/or the selective reconfiguration thereof towards an open position based on a user engagement with at least a portion of the bottom panel positioning assembly 200 (e.g., the positioning element 220) that causes a movement thereof in a downward vertical direction (e.g., in the negative y-direction, as illustrated) along the height of the first sidewall 400.

In various embodiments, an exemplary bottom panel positioning assembly 200 may comprise a mounting bracket 210 configured to be fixedly secured to a portion of a conveyor frame, such as, for example, an outer surface 401 of a first sidewall 400, so as to define the position of the bottom panel positioning assembly 200 along the length of a conveyor assembly 10. The mounting bracket 210 may comprise an at least substantially planar rigid component defined at least in part by an inner mounting bracket surface 210b configured to be abutted against the outer surface 401 of the first sidewall 400 upon installation of the bottom panel positioning assembly 200 relative to the first sidewall 400, and an outer mounting bracket surface 210a along which at least a portion of the slider assembly 220 of the bottom panel positioning assembly 200 may be arranged, as described in further detail herein. For example, in various embodiments, the mounting bracket 210 may be attached via a fastening means to the outer surface 401 of the first sidewall 400 such that at least a portion of the mounting bracket 210 (e.g., a positioning element track groove 211 defined therein) overlaps a sidewall groove 411 defined within the first sidewall 400, as described herein. In various embodiments, the first sidewall 400 of the conveyor frame may comprise a sidewall groove 411 that extends through the thickness of the first sidewall 400 and is configured to facilitate operation of a bottom panel positioning assembly 200 arranged relative thereto by receiving at least a portion of a slider assembly 220 (e.g., a positioning element protrusion 222) therein. For example, the sidewall groove 411 may be configured to receive a positioning element protrusion 222 of the slider assembly 220 of the bottom panel positioning assembly 200 such that at least a portion of the positioning element protrusion 222 extending therethrough is disposed within the internal conveyor portion of the conveyor frame (e.g., above the bottom panel 100) and arranged such that a panel connection element 250 positioned within the internal conveyor portion may be connected directly between the slider assembly 220 and the bottom panel 100 (e.g., the panel attachment element 121). In various embodiments, the sidewall groove 411 of the first sidewall 400 may comprise a slot having a length that extends in an at least substantially vertical direction (e.g., in the y-direction) along the height of the first sidewall 400. For example, the vertical sidewall groove 411 may be arranged along the first sidewall 400 at a position that is aligned with, corresponding to, and/or at least substantially adjacent a dynamic end of an exemplary hinged bottom panel 100 that is connected to the conveyor frame.

In various embodiments, the mounting bracket 210 of a bottom panel positioning assembly 200 may comprise a positioning element track groove 211 that extends through the thickness of the mounting bracket 210 and is configured to receive and/or at least partially secure at least a portion of a slider assembly 220, such as, for example, a positioning element protrusion 222, therein to facilitate the positioning of the at least a portion of the slider assembly 220 relative to the mounting bracket 210. In various embodiments, the positioning element track groove 211 may comprise a slot having a length that extends along the mounting bracket 210 in an at least substantially vertical direction (e.g., in the y-direction). For example, in various embodiments, the mounting bracket 210 may be secured to the outer surface 401 of the first sidewall 400 in a position wherein the positioning element track groove 211 and the sidewall groove 411 of the first sidewall 400 are in an at least substantially aligned configuration such that a portion of a slider assembly 220 of the bottom panel positioning assembly 200 positioned relative to the outer surface 401 of the first sidewall 400 may simultaneously extend through both the positioning element track groove 211 and the sidewall groove 411 into the internal conveyor portion of the conveyor assembly.

In various embodiments, an exemplary bottom panel positioning assembly 200 may further comprise a slider assembly 220 arranged relative to the mounting bracket 210 and configured to facilitate the selective arrangement of the bottom panel positioning assembly 200 between a nominal position and an engaged position. As illustrated in FIGS. 3A and 3B, an exemplary bottom panel positioning assembly 200 may comprise a slider assembly 220 comprising a positioning element 221, a positioning element protrusion 222, a positioning element handle 223, a locking pin aperture 224, and a panel connection element 225.

In various embodiments, a positioning element 221 of an exemplary slider assembly 220 may comprise a dynamic component that is slidably engaged with the mounting bracket 210 so as to be moveable along the outer mounting bracket surface 210a throughout a range of motion relative to the mounting bracket 210. For example, the positioning element 221 may be accessible to a user for selective reconfiguration and/or interaction therewith from the exterior of the conveyor assembly (e.g., alongside an outer surface 401 of the first sidewall 400), such as, for example, in order to move the positioning element 221 throughout a range of motion between a nominal position and an engaged position. In various embodiments, as described herein, the slider assembly 220 (e.g., the positioning assembly 221) may be biased towards a nominal position (e.g., based at least in part on a retention element 230 attached to the positioning assembly 221) and may be selectively reconfigured in an engaged position based on a user interaction with the positioning element 221. For example, in various embodiments, the positioning element 221 may be configured to receive user interaction therewith at a handle 223 that is rigidly secured thereto. The handle 223 secured to the positioning element 221 may be configured such that at least substantially all of the user-generated forces applied to the handle 223 as a result of a user interaction therewith may be transmitted to the positioning element 221. In such an exemplary circumstance, the handle 223 may be configured to be physically engaged by a user (e.g., pushed and/or pulled in one or more at least partially vertical directions) in order to cause the positioning element 221 to move throughout a range of motion defined along at least a portion of the mounting bracket 210 between a nominal position and an expanded position.

In various embodiments, the range of motion of the positioning element 221 relative to the mounting bracket 210 may be defined at least in part by a range of motion of a positioning element protrusion 222 rigidly secured to the positioning element 221 and extending therefrom into the positioning element track groove 211 of the mounting bracket 210. For example, the positioning element 221 may include a positioning element protrusion 222 comprising a pin, a bolt, a rod, a hook, and/or the like that extends from an inwardly-facing surface of the positioning element 221 (e.g., from the surface of the positioning element engaged with the outer mounting bracket surface 210a) and is configured to protrude into the positioning element track groove 211 so as to at least partially align the positioning element 221 relative to the positioning element track groove 211. As illustrated in FIGS. 3A and 3B, the positioning element protrusion 222 may extend from the positioning element 221, through both the positioning element track groove 211 and the sidewall groove 411 aligned therewith, and into the internal conveyor portion of the conveyor assembly. For example, the positioning element track groove 211 may restrict the linear motion of positioning element protrusion 222 relative to the mounting bracket 210 in two or more directions such that the range of motion of positioning element protrusion 222 within the positioning element track groove 211 is defined in an at least substantially vertical direction (e.g., in a y-direction, as illustrated). In such an exemplary circumstance, the positioning element protrusion 222 may be configured to be moveable within the positioning element track groove 211 so as to define a range of motion that extends along the length of the positioning element track groove 211. Based at least in part on the rigid connection of the positioning element protrusion 222 to the positioning element 221, the positioning element 221 may exhibit a range of motion defined along the length of the positioning element track groove 211 that corresponds to the range of motion of the positioning element protrusion 222 within the positioning element track groove 211, such that the vertical movement of the positioning element 221 between a nominal position and an engaged position may be defined by the movement of the positioning element protrusion 222 (e.g., sliding, translating, and/or otherwise moving linearly) along the length of the positioning element track groove 211.

In various embodiments, the positioning element 221 may be operatively connected to a bottom panel 100 such that the positioning element 221 being selectively moved from a nominal position in a downwards vertical direction (e.g., along the length of the positioning element track groove 211) towards an engaged position may cause at least a portion of the bottom panel 100 operatively connected thereto to exhibit a corresponding movement, so as to cause the bottom panel 100 to be reconfigured from a closed position to an at least partially open position. In various embodiments, as described herein, the sliding assembly 220 of the bottom panel positioning assembly 200 may comprise a panel connection element 225 configured to extend between the positioning element 221 (e.g., a distal end of the positioning element protrusion 222 disposed within the internal conveyor portion of the conveyor assembly) and a panel attachment element 121 in order to operatively connect the bottom panel positioning assembly 200 (e.g., the sliding assembly 220) to the hinged bottom panel 100.

In various embodiments, the panel connection element 225 may comprise an at least substantially linear element, such as, for example, a cable, a wire, a rod, an arm, and/or the like, defined at least in part by a length that extends between a first end configured for attachment to at least a portion of the sliding assembly 220 and a second end configured for attachment to the hinged bottom panel 100 positioned therebelow. For example, the panel connection element 225 may be configured such that the first end thereof may be attached, fastened, and/or otherwise secured to a portion of the positioning element protrusion 222 that is disposed within the internal conveyor portion (e.g., a distal end of the positioning element protrusion 222) and the second end thereof may be attached, fastened, and/or otherwise secured to the panel attachment element 121 positioned within a dynamic portion of the hinged bottom panel 100. In various embodiments, the panel connection element 225 may be configured to maintain a relative arrangement between the positioning element 221 of the sliding assembly 220 and the dynamic end of the hinged bottom panel 100 throughout a range of motion of the positioning element 221. For example, in various embodiments, the relative arrangement between the positioning element 221 and the dynamic end of the bottom panel 100 (e.g., the panel attachment element 121) may be defined at least in part by a separation distance between the positioning element 221 (e.g., the positioning element protrusion 222) and the panel attachment element 121 that is defined by the length of the panel connection element 225 and may be maintained as the positioning element 221 is moved between the nominal position and an engaged position relative (e.g., as the positioning element 221 is selectively moved along the positioning element track groove 211). For example, in such an exemplary configuration, as the positioning element 221 is moved throughout its vertical range of motion relative to the outer mounting bracket surface 210a and the positioning element protrusion 222 is accordingly moved in a vertical direction along the length of the positioning element track groove 211 and the sidewall groove 411 aligned therewith, the panel attachment element 121 of the bottom panel 100 may exhibit a corresponding movement that is defined at least in part by a rotation of the bottom panel 100 about the hinge axis and comprises an at least partially vertical component defined in a vertical direction corresponding to the direction of the vertical movement of the positioning element 221.

In various embodiments, the panel connection element 225 may have either an at least substantially rigid configuration or an at least substantially non-rigid configuration. For example, in an exemplary configuration wherein the panel connection element 225 comprises an at least substantially rigid configuration (e.g., wherein the panel connection element 225 comprises a rod), the panel connection element 225 may be configured to direct the repositioning of the bottom panel 100 via either a pushing force or a pulling force that is applied directly to the bottom panel 100 (e.g., to the panel attachment element 121) via the second end of the panel connection element 225 attached thereto based on a corresponding movement of the positioning element 221 connected to the first end of the panel connection element 225. Alternatively, in an exemplary configuration wherein the panel connection element 225 comprises an at least substantially non-rigid configuration, (e.g., wherein the panel connection element 225 comprises a bendable and/or flexible wire, string, cable, and/or the like), the panel connection element 225 may be configured to enable a repositioning of the bottom panel 100 in an upward vertical direction via a pulling force that is applied directly to the bottom panel 100 (e.g., to the panel attachment element 121) via the second end of the panel connection element 225 attached thereto based on a corresponding movement of the positioning element 221 connected to the first end of the panel connection element 225. Further, in such an exemplary configuration where the panel connection element 225 comprises a non-rigid configuration, the panel connection element 225 may be configured to enable a repositioning of the bottom panel 100 in a downward vertical direction based at least in part on the downward vertical movement of the positioning element 221 connected to the first end of the panel connection element 225 causing at least a portion of the tension forces within the panel connection element 225 (e.g., being imparted on the bottom panel 100 so as to embody a retention force) to be minimized. Upon the retention forces acting on the bottom panel 100 from the panel connection element 225 (e.g., via the fixed attachment of the send end of the panel connection element 225 thereto), the gravitational forces acting on the bottom panel 100 may cause the repositioning of the bottom panel 100 to rotate about the hinge axis thereof towards an open position until the dynamic portion of the bottom panel 100 reaches a position relative to the positioning element 221 wherein the non-rigid panel connection element 225 extending therebetween is reestablished in a taut and/or substantially tightened configuration (e.g., such that one or more tension forces acting on the panel attachment element 121 of the bottom panel 100 may embody retention forces configured to maintain the position of the dynamic portion of the bottom panel 100 relative to the positioning element 221).

In various embodiments, as described in further detail herein, an exemplary bottom panel positioning assembly 200 may comprise a retention element 230 that may be connected to the positioning element 221 and configured to bias the positioning element 221 towards the nominal position. In various embodiments, the retention element 230 may be connected to both the positioning element 221 and a retention element anchor 231 rigidly secured to the outer mounting bracket surface 210a of the mounting bracket 210 such that the movement of the positioning element 221 along the positioning element track groove 211 between the nominal position and an engaged position (e.g., relative to the outer mounting bracket surface 210a) is affected by one or more retention element forces corresponding to the configuration of the retention element 230 that act on the positioning element 221. In various embodiments, the retention element 230 may be configured to facilitate repeatability within the bottom panel positioning assembly 200 by being predisposed to cause one or more components of the slider assembly 220, such as, for example, the positioning element 221, to be moved to a neutral, default, and/or otherwise stable state, such as, for example a nominal position corresponding to the bottom panel 100 operatively connected thereto being in a closed position, when no other external user interaction forces are acting on the bottom panel positioning assembly 200.

In various embodiments, the retention element 230 may be fixedly secured at a first end thereof to the retention element anchor 231, and, further, may be fixedly secured at an opposing second end thereof to a top portion (e.g., a top surface) of the positioning element 221. For example, as illustrated, the retention element anchor 231 may be located along the outer mounting bracket surface 210a in a position at least substantially above a top end 211a of the positioning element track groove 211, such that the retention element anchor 231 may maintain a position at least substantially above the positioning element 221 throughout the range of motion of the positioning element 221. Further, in various embodiments, the retention element anchor 231 may be arranged so as to be at least substantially vertically aligned with the length of the positioning element track groove 211 such that, as the positioning element 221 is moved between a nominal position and an engaged position, the retention element 230 may maintain an at least substantially vertical configuration (e.g., a configuration wherein the length of the retention element 230 extending between the retention element anchor 231 and the positioning element 221 extends in an at least substantially vertical direction) in order to minimize the non-vertical forces transmitted to the positioning element 221 as a result of a physical engagement of the positioning element 221 (e.g., the positioning element protrusion 222) within one or more adjacent surfaces defined within the bottom panel positioning assembly 200.

In various embodiments, the retention element anchor 231 may be arranged along the outer mounting bracket surface 210a relative to the positioning element 221 such that an exemplary force generated by the retention element 230 (e.g., a retention force) and acting on the positioning element 221 may embody a pulling force in that acts on the portion of the positioning element 221 to which the second end of the retention element 230 is attached (e.g., the top portion of the positioning element 221) in an at least partially upwards vertical direction towards the retention element anchor 231 such that the positioning element 221 is biased towards a nominal positioned and/or the positioning element protrusion 222 is biased towards the top end 211a of the sliding track groove 211. In such an exemplary circumstance, based at least in part on the operative connection between the sliding assembly 220 and the bottom panel 100 (e.g., via the panel connection element 225), the one or more retention forces generated by the retention element 230 that cause the positioning element protrusion 222 to be biased towards the top end 211a of the sliding track groove 211 may be transmitted at least in part to the panel attachment element 121 of the hinged bottom panel such that a corresponding moment is imparted on the dynamic end of the bottom panel 100 that causes the bottom panel 100 to be biased towards a closed position. For example, the bottom panel positioning assembly 200 may be configured to enable a selective reconfiguration of the corresponding bottom panel 100 from a closed position to an open position based upon a user interaction with the slider assembly 220 (e.g., with a positioning element 221 and/or a handle 223 fixedly secured thereto) that is defined by the positioning element 221 being at least temporarily reconfigured from a nominal position (e.g., wherein the positioning element protrusion 222 is positioned at least substantially adjacent the top end 211a of the positioning element track groove 211) to an engaged position defined by a position along the length of the positioning element track groover 211 that is vertically below the nominal position. In such an exemplary circumstance, upon a user disengagement of the positioning element 221 (e.g., and/or the handle 223), the positioning element 221 may automatically return to a default and/or stable position defined by the nominal position, thereby causing the hinged bottom panel 100 operatively connected thereto to return to automatically return to the closed position, as described herein.

As non-limiting examples provided for illustrative purposes, in various embodiments, an exemplary retention element 230 may comprise a spring element (e.g., a torsional spring element, a tension spring element, a compression spring element, and/or the like), an at least partially elastic material element comprising a material configured to operably apply and/or transfer a retaining force to the positioning element 221, as described herein, and/or any other suitable mechanical tensioning means configured for attachment to a retention element anchor 231 arranged about the mounting bracket 210 and engagement with the positioning element 221 to operably facilitate the imposition of a retention force on the positioning element 221, as described herein. As a further non-limiting example provided for illustrative purposes, in various embodiments, an exemplary retention element 230 may comprise an at least partially automated configuration including, for example, a liner actuator configured for electronic communication with a control device (e.g., a controller, control circuitry, and/or the like) of the conveyor assembly to facilitate the selective extension and/or retraction of the linear actuator in order to cause a corresponding movement of the positioning element 221. In such an exemplary configuration, an exemplary bottom panel positioning apparatus 200 may comprise a user interface comprising a display such as, for example, a screen, configured for user interaction therewith such that the movement of the bottom panel 100 engaged with the bottom panel positioning assembly 200 between the open position and the closed position may be selectively controlled via the user interface of the bottom panel positioning assembly 200.

In various embodiments wherein the retention element 230 comprises a spring element, as illustrated in FIGS. 3A and 3B, the retention element 230 may be configurable between a neutral position and an at least partially expanded position based at least in part on the configuration of the positioning element 221 (e.g., between the nominal position and an engaged position). For example, in various embodiments, the retention element 230 may define a neutral position when the positioning element 221 is in a nominal position and may be reconfigured to an at least partially expanded position as the positioning element 221 is selectively slid, shifted, translated, and/or otherwise moved (e.g., via user interaction therewith) along the positioning element track groove 211 in an at least substantially downward vertical direction (e.g., in the negative y-direction, as illustrated) away from the retention element anchor 231. Alternatively, or additionally, as described herein, the retention element 230 may define at least partially expanded position when the positioning element 221 is in a nominal position (e.g., when the bottom panel 100 operatively connected to the sliding assembly 220 is in a closed position) such that the positioning element 221 is at least substantially continuously biased (e.g., pulled) toward a top end 211a of the positioning element track groove 211, even when the positioning element 221 is provided in the nominal position.

In various embodiments, as illustrated, an exemplary bottom panel positioning apparatus 200 may comprise one or more positioning element guide components 240 fixedly secured relative to the outer mounting bracket surface 210a of the mounting bracket 210 and configured to at least partially restrict the movement of positioning element 221 relative to the mounting bracket 210 in one or more linear directions, such as, for example, an outward lateral direction extending away from the outer mounting bracket surface 210a (e.g., in the negative x-direction, as illustrated). For example, the one or more positioning element guide components 240 may be configured to at least partially secure the arrangement of the positioning assembly 221 relative to the mounting bracket 210 to facilitate the slidable engagement of the positioning element 221 relative to the mounting bracket (e.g., within the positioning element track groove 211) while preventing the positioning element 221 (e.g., the positioning element protrusion 222) from being removed from within the positioning element track groove 211. In various embodiments, the one or more positioning element guide components 240 and the mounting bracket 210 may collectively define a channel that is defined by a space between the one or more inner surfaces of the one or more positioning element guide components 240 and the outer mounting bracket surface 210a within which at least a portion of the positioning element 221 may be disposed. As illustrated, such an exemplary channel defined in part by the one or more positioning element guide components 240 may have a length that extends in a vertical direction at least substantially parallel to the length of the positioning element track groove 211 of the mounting bracket 210 such that at least a portion of the positioning element 221 may move along the length of the channel as the positioning element 221 is moved throughout a vertical range of motion along the length of the positioning element track groove 211 between a nominal and an engaged position, as described herein. For example, in various embodiments, at least a portion of the range of motion of the positioning element 221 relative to the mounting bracket 210 may be defined by the one or more positioning element guide components 240.

Figure 4B:
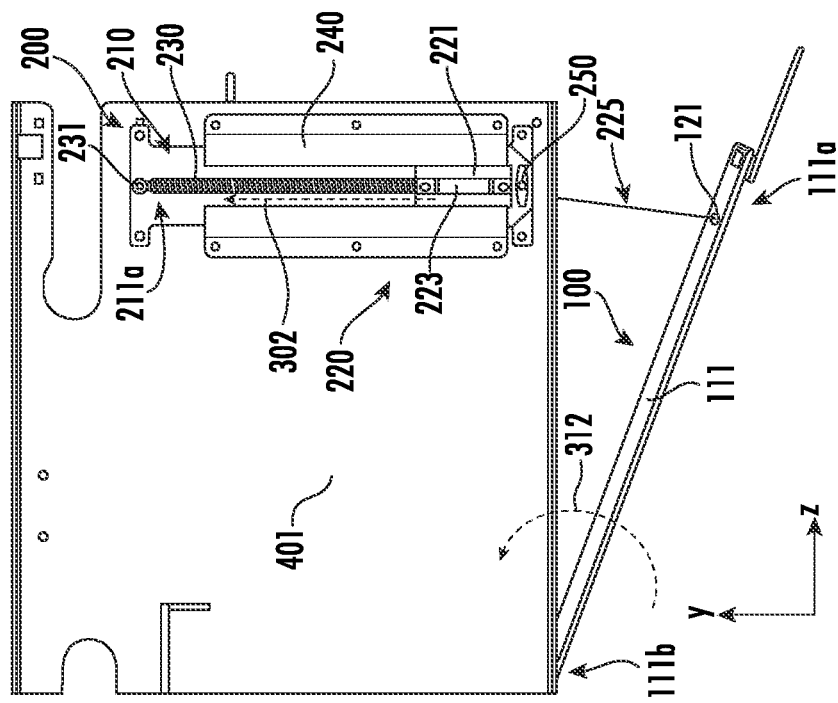
FIGS. 4A and 4B illustrate various side perspective views of an exemplary conveyor apparatus according to exemplary embodiments described herein.
Figure 4A:
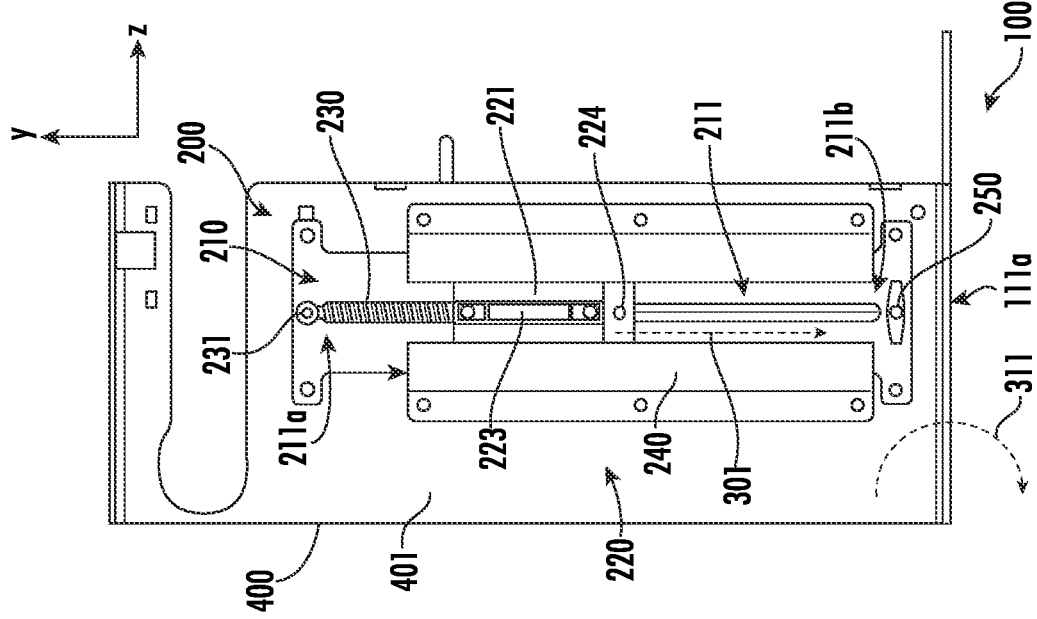

FIGS. 4A-4B illustrate various side perspective views of an exemplary conveyor apparatus according to exemplary embodiments described herein. In particular, FIG. 4A shows an exemplary bottom panel positioning assembly 200 comprising a mounting bracket 210, a sliding assembly 220, and a retention element 230, wherein the sliding assembly 220 is shown in a nominal position. As described herein, sliding assembly 220 of the bottom panel positioning assembly 200 includes a positioning element 221 that is slidably engaged with the mounting bracket 210 and configured for movement throughout a range of motion defined along the length of the positioning element track groove 211 (e.g., based at least in part on the arrangement of a positioning element protrusion 222 extending therefrom within the positioning element track groove 211) between a nominal position and an engaged position. The configuration of the sliding assembly 220 between the nominal position and an engaged position is based at least in part on the configuration of the positioning element 221. Further, as described herein, the positioning element 221 (e.g., the positioning element protrusion 222) may be operatively connected to a dynamic end of a hinged bottom panel 100 (e.g., a panel attachment element 121) such that the configuration of the bottom panel 100 between a closed position and an open position is based at least in part on the configuration of the positioning element 221 (e.g., between the nominal position and an engaged position).

The positioning element 221 is shown in a nominal position in FIG. 4A, wherein the bottom panel 100 operatively connected to the positioning element 221 via a panel connection element is arranged in a closed position relative to the conveyor frame (e.g., the opposing sidewalls thereof, including first sidewall 400). For example, in various embodiments, the nominal position of the sliding assembly 220 (e.g., the positioning element 221) may be further defined at least in part by one or more of the positioning element 221 being positioned at an uppermost position within the range of motion thereof (e.g., as defined in the vertical y-direction, as illustrated), the positioning element 221 (e.g., and/or the positioning element protrusion 222) being positioned at an at least substantially top portion of the positioning element track groove 211, such as, for example, at a position along the length of the positioning element track groove 211 that is at least substantially adjacent the top end 211a thereof, the retention element 230 that is attached to the positioning element 221 being in an at least substantially nominal (e.g., unexpanded) configuration, and/or the like.

As described herein, in various embodiments, a nominal position of an exemplary sliding assembly 220 may be defined by a position assumed by the positioning element 221 when the hinged bottom panel 100 operatively connected thereto is provided in a closed position, such as, for example, when the positioning element 221 is positioned such that the positioning element protrusion 222 extending therefrom and into an internal conveyor portion of the conveyor assembly (e.g., extending through the positioning element track groove 111 and the sidewall groove 441 aligned therewith), is separated from the bottom side of the conveyor frame and/or the closed bottom panel 100 operatively connected therewith by a vertical separation distance that is at least substantially equal to the length of the panel connection element 225, as described herein. As such, a sliding assembly 220 of an exemplary bottom panel positioning assembly 200 being arranged in a nominal position may correspond to the bottom panel 100 being configured to prevent unauthorized and/or unintended access to an internal conveyor portion of the conveyor assembly or the bottom side of the conveyor surface.

As illustrated, the retention element 230 connected to the positioning element 221 may be configured to apply a pulling force (e.g., a pulling spring force) to the positioning element 221 in order to at least partially affect the position of the positioning element 221 within the positioning element track groove 211 between the nominal position and the engaged position. For example, the retention element 230 may be secured between a retention element anchor 231 rigidly secured to the mounting bracket 210 (e.g., at the outer mounting bracket surface 210a) and the positioning element 221. The retention element 230 may be configured such that when the positioning element 221 is arranged in the nominal position, as illustrated in FIG. 4A, the retention element 230 may be provided in an at least partially engaged (e.g., strained, expanded, tensioned, and/or the like) configuration, wherein a force generated by the retention element 230 acts to pull the positioning element 221 in an at least substantially upward vertical direction (e.g., in the positive y-direction, as illustrated) towards the retention element anchor 231 and/or a top end 211a of the positioning element track groove 211.

In various embodiments, the sliding assembly 220 may be operatively connected to a dynamic portion 111a of the hinged bottom panel 100 and configured such that the tension force generated by the retention element 230 and imparted as a pulling force on the positioning element 221 may be at least partially transmitted to a panel attachment element provided at a dynamic portion 111a along of the hinged bottom panel 100 (e.g., via the panel connection element 225 extending between the positioning element protrusion 222 and the panel attachment element 121) such that a corresponding force is imparted as a pulling force on the panel attachment element. In such an exemplary circumstance, based at least in part on the hinged configuration of the bottom panel 100 relative to the conveyor frame (e.g., relative to the first sidewall 400), as described herein, the pulling force imparted on the dynamic portion of the hinged bottom panel 100 (e.g., at the panel attachment element) may embody a non-lateral torque, a moment, and/or the like that acts on the bottom panel 100 at the dynamic portion thereof that may cause the bottom panel 100 to rotate about a hinge axis defined by the plurality of bottom panel hinges, as described herein, in a direction at least substantially towards a closed position (e.g., a counter-clockwise rotational direction relative to the orientation of FIG. 4A), pulling the dynamic end 111a of the bottom panel 100 towards the internal conveyor portion of the conveyor assembly such that the hinged bottom panel 100 is biased towards the nominal position.

With reference to FIG. 4A, an exemplary circumstance is depicted wherein the hinged bottom panel 100 is arranged in a closed position and at least a portion of the sliding assembly of an exemplary bottom panel positioning assembly 200 (e.g., the positioning element 221 of the sliding assembly) is positioned in a nominal position. As illustrated, the at least a portion of the sliding assembly of the bottom panel positioning assembly 200 (e.g., the positioning element 221) positioned in the nominal position is configured for actuation thereof based at least in part on an actuation force 301 generated by a user interaction with the positioning element 221. As illustrated, the positioning element 221 (e.g., a handle 223 fixedly secured thereto) may be engaged by a user such that a first vertical force 301 is imparted on the positioning element 221 in order to selectively reconfigure the positioning element 221 from the nominal position to an engaged position, as described herein. In various embodiments, as illustrated, an actuation of the sliding assembly 220 may be embodied by a positioning element 221 (e.g., a handle 223 connected thereto) being pushed, pulled, and/or otherwise moved along the length of the positioning element track groove 211 towards a bottom end 211b thereof by a user, such that an actuation force 301 is imparted on the positioning element 221 in an at least partially downward vertical direction away from the away from the retention element anchor 231 (e.g., in the negative y-direction, as illustrated in FIG. 4A). In various embodiments, the positioning element 221 may be slidably engaged with the mounting bracket 210 such that the exemplary actuation force 301 applied to the positioning element 221 (e.g., at the handle 223) by a user may cause the positioning element 221 to be slid, translated, and/or otherwise moved within the positioning element track groove 211 in a vertically downward direction to an engaged position.

As described herein, in such exemplary circumstances wherein the positioning element 221 of the sliding assembly of the exemplary bottom panel positioning assembly 200 is selectively moved from a nominal position to an engaged position, at least a portion of the hinged bottom panel 100 operatively connected thereto (e.g., a dynamic portion 111a of the bottom panel 100) may exhibit a corresponding movement embodying a rotational movement in a first rotational direction 311 about the hinge axis defined along the fixed end of the bottom panel 100 from a closed position to an at least partially open position. For example, upon a user interaction with the positioning element 221 (e.g., a handle 223 connected thereto) that is defined by an actuation force 301 being imparted on the positioning element 221 and causing the positioning element 221 to move within the positioning element track groove 211 in a vertically downward direction to the engaged position, at least a portion of the tension forces acting on the bottom panel 100 (e.g., on the on the dynamic portion 111a at the panel attachment element positioned therein) from the panel connection element 225 to counteract the one or more gravitational forces acting on the bottom panel 100 (e.g., the weight of the bottom panel 100) and retain the position of the bottom panel 100 may be at least substantially minimized. In various embodiments, as an actuation force 301 causes the positioning element 221 to move along the length of the positioning element track groove 211 in a downward vertical direction towards the bottom panel 100 (e.g., towards a bottom end 211b of the positioning element track groove 211), the tension forces previously present within the panel connection element 225 when the panel connection element 225 was in a fully tightened and/or taut configuration between the positioning element 221 and the bottom panel 100 may at least substantially dissipate. In response, the gravitational forces acting on the dynamic portion 111a of the bottom panel 100 may cause the hinged bottom panel 100 to exhibit a rotational movement about the lateral hinge axis defined at a fixed end 111b of the bottom panel 100 from the closed position to an at least partially open configuration corresponding to the relative position of the engaged position exhibited by the positioning element 221 with respect to a fully engaged position. For example, in various embodiments, the gravitational forces acting on the bottom panel 100 may cause the dynamic portion 111a to rotate about the hinge axis of the bottom panel 100 in a first rotational direction 301 away from the positioning element 221 and towards an open position. In various embodiments, the dynamic portion 111a of the bottom panel 100 may rotate in the first rotational direction 311, such as, for example, in the clockwise direction about the lateral hinge axis relative to the orientation shown in FIG. 4A, until the distance between the positioning element protrusion 222 of the positioning element 221 and the panel attachment element within the dynamic portion 111a is at least substantially equal to the length of the panel connection element 225, such that the tension forces within the panel connection element 225 are at least partially restored and the panel connection element 225 reestablishes a fully-tightened and/or taut configuration. For example, in such an exemplary circumstance, the rotation of the dynamic portion 111a of the bottom panel 100 towards an open position upon actuation of the sliding assembly of the bottom panel positioning assembly 200, may be defined at least in part by at least a portion of the dynamic portion 111a, such as, for example, the portion of a first lateral frame element 111 of the bottom panel 100 to which the panel attachment element is secured, moving relative to the first sidewall 400 in a direction at least substantially away from the bottom side thereof (e.g., in the negative y-direction, as illustrated).

In various embodiments, the bottom panel positioning assembly 200 may be configured such that as the positioning element 221 is moved along the positioning element track groove 211 from a nominal position to an engaged positioned in response to an actuation force 301 being applied thereto, the retention element 230 connected to the positioning element 221 may generate a force that acts on the positioning element 221 in a direction opposing the motion of the positioning element 221. For example, a movement of the positioning element 221 towards an engaged position in the downward vertical direction corresponding to the directional configuration of the actuation force 301 may cause the retention element 230 to be reconfigured from a first engaged position exhibited by the retention element 230 when the positioning element 221 is in the nominal position, as illustrated in FIG. 4A, to a second engaged position. For example, in an exemplary circumstance wherein the retention element 230 comprises a spring element, as illustrated in the exemplary bottom panel positioning assembly 200 of FIGS. 4A-4B, the movement of the positioning element 221 from a nominal position towards an engaged position causes the retention element 230 to be reconfigured such that the spring element is further expanded from a first expanded position to a second expanded position. In such an exemplary circumstance, as the retention element 230 is extended to the second expanded position, the retention element 230 may at least substantially continuously apply a pulling force to the positioning element 221 (e.g., at the top portion of the positioning element 221 to which the retention element 230 is attached) that opposes the actuation force 301 being applied to the positioning element 221 by the user by imparting an equal and opposite pulling force on the positioning element 221.

The resultant force generated by the retention element 230 and imparted on the positioning element 221 to oppose the user-initiated force 301 (e.g., based at least in part on the retention element 230 being in an engaged and/or expanded configuration) may cause a retention force to be imparted on the positioning element 211 in a direction that is at least substantially opposite of the direction of the actuation force 301, such as, for example, in an at least substantially upward vertical direction (e.g., in the positive y-direction, as illustrated). For example, FIG. 4B illustrates an exemplary circumstance wherein, based on a resultant pulling force 302 generated by the retention element 230 and imparted on the positioning element 221, an exemplary bottom panel positioning assembly 200 may be configured such that the sliding assembly thereof (e.g., the positioning element 221) may be configured to automatically return (e.g., move) to a nominal position upon a user releasing and/or otherwise disengaging the positioning element 221 (e.g., the handle 223) such that the actuation force 301 described in reference to FIG. 4A is no longer being applied to the positioning element 221 (e.g., is dissipated to a value of at least substantially zero). In various embodiments, the resultant force 302 may comprise a spring force embodying a pulling force that acts on the positioning element 221 (e.g., a top portion thereof to which the retention element 230 is attached) to pull at least a portion of the positioning element 221, such as, for example, the positioning element protrusion 222, in an upward vertical direction toward the retention element anchor 231 (e.g., toward a top end 211a of the positioning element track groove 211). As illustrated, the force 302 acting on the positioning element 221 may be generated based at least in part on the expanded configuration of the retention element 230 that corresponds to the positioning element 221 being arranged in an engaged configuration. For example, in the exemplary configuration illustrated in FIG. 4B, wherein the positioning element 221 is arranged in an engaged position, the retention element 230 provided in the second expanded position may urge the positioning element protrusion 222 disposed within the positioning element track groove 211 towards a top end 211a of the positioning element track groove 211 via a pulling force acting on the positioning element 221 from the retention element 230 (e.g., at least in partially in the positive-y direction, as illustrated).

In such an exemplary circumstance, based at least in part on the operative connection of the positioning element protrusion 222 to a dynamic portion 111a of the bottom panel via the panel connection element 225, the retention element 230 being arranged in the second expanded position may cause the panel attachment element of the bottom panel 100 to be urged in an upward vertical direction corresponding to the retention forces acting on the positioning element protrusion 222. For example, based on the hinged configuration of the bottom panel 100 about the hinge axis, such retention forces acting on the panel attachment element within the dynamic portion 111a of the bottom panel 100 may cause a non-lateral torque and a moment (e.g., corresponding to the retention forces acting on the positioning element 221) to be imparted on the dynamic portion 111a in a second rotational direction 312 that is at least substantially opposite the first rotational direction 311. In such an exemplary circumstance, the bottom panel 100 may be urged to rotate about the hinge axis in the second rotational direction 312 towards the closed position. For example, in various embodiments, the dynamic portion 111a of the bottom panel 100 may rotated about the hinge axis of the bottom panel 100 in a counter-clockwise direction corresponding to the second rotational direction 312 (e.g., relative to the orientation shown in FIG. 4B) until the sliding assembly of the bottom panel positioning assembly 200 (e.g., the positioning element 221) returns to a nominal position, as described herein, such as, for example, until at least a portion of the hinged bottom panel 100 physically abuts a first sidewall 400 of the conveyor frame and/or until the retention element 230 is configured in a stable (e.g., non-expanded) configuration.

In various embodiments, as illustrated in FIGS. 4A and 4B, an exemplary bottom panel positioning assembly 200 may comprise a locking pin 250 that is configured to be removably secured within corresponding locking pin apertures defined within the mounting bracket 210 and the positioning element 221 in order to selectively secure the positioning element 221 in an engaged position by preventing the positioning element 221 from moving relative to the mounting bracket 210. For example, the positioning element 221 may comprise a positioning element locking pin aperture 224 extending through a thickness of the positioning element 221 and embodying an opening positioned along a bottom portion of the positioning element 221 within which the positioning element 221 is configured to receive at least a portion of the locking pin 250. Further, the mounting bracket 210 may comprise a mounting bracket locking pin aperture 212 extending through the thickness of the mounting bracket 210 and embodying an opening within which the mounting bracket 210 is configured to receive at least a portion of the locking pin 250. In various embodiments, the mounting bracket locking pin aperture 212 may be arranged about the mounting bracket 210 at a position at least substantially below a bottom end 211b of the positioning element track groove 211 and at least substantially vertically aligned with the length of the positioning element track groove 211 such that, when the positioning element 221 is moved along the slider track guard 211 to a fully engaged position at least substantially adjacent the bottom end 211b, the positioning element locking pin aperture 224 and the mounting bracket locking pin aperture 212 may be arranged in an at least substantially overlapping (e.g., coaxial) configuration. In such an exemplary configuration, upon the positioning element 221 being arranged in a fully engaged position, the locking pin 250 may be selectively positioned in a locked position wherein at least a portion of the locking pin 250 is disposed within the positioning element locking pin aperture 224 and the mounting bracket locking pin aperture 212 at substantially the same time so as to prevent the positioning element 221 from moving relative to the mounting bracket 210 towards a nominal position.

In various embodiments, the locking pin 250 may be configurable between a locked configuration and an unlocked configuration to facilitate the selective locking of the positioning element 221 relative to the mounting bracket 210 when the positioning element is in a fully engaged position, as illustrated in FIG. 4B such that the hinged bottom panel 100 operatively connected to the positioning element 221 may be selectively locked in an open configuration based on the positioning of the locking pin 250 in the locked configuration. For example, the locking pin 250 may be selectively inserted into a locked position (e.g., extending simultaneously through into both the mounting bracket locking aperture 212 and the positioning element locking aperture 224) to allow maintenance and/or service personnel to access the internal conveyor portion via the opening defined by the bottom panel 100 in an open position without requiring the maintenance and/or service personnel to at least substantially continuously engage (e.g., interact with) the bottom panel positioning assembly 200 to maintain the open position of the bottom panel 100.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A conveyor apparatus comprising:
a conveyor frame embodying a structural support for a conveyor surface, the conveyor frame defining a conveyor length that extends in a length direction and comprising:
a plurality of opposing sidewalls extending in the length direction, including a first sidewall defining a first lateral side of the conveyor frame; and
a bottom panel comprising a hinged configuration relative to the plurality of opposing sidewalls such that the bottom panel is configured for movement throughout a range of rotational motion between a closed position and an open position; and
a control device; and
a bottom panel positioning assembly comprising:
a mounting bracket secured to the first sidewall of the conveyor frame; a positioning element slidably engaged relative to the mounting bracket and configured to move throughout a range of motion between a nominal position and an engaged position; and
a linear actuator in electronic communication with the control device to facilitate selective extension and/or retraction of the linear actuator in order to cause a corresponding movement of the positioning element to the nominal position or the engaged position.

2. The conveyor apparatus of claim 1, wherein the bottom panel positioning assembly is operatively connected to the bottom panel based at least in part on a panel connection element that extends between the bottom panel and the positioning element.

3. The conveyor apparatus of claim 2, wherein the bottom panel positioning assembly is configured such that the positioning element being positioned in the nominal position of the positioning element corresponds to the bottom panel being positioned in the closed position.

4. The conveyor apparatus of claim 1, wherein the mounting bracket is secured to an outer surface of the first sidewall such that the positioning element is accessible for user interaction therewith via the outer surface of the first sidewall.

5. The conveyor apparatus of claim 4, wherein the bottom panel positioning assembly is operatively connected to the bottom panel such that the linear actuator engaged with the positioning element causes the bottom panel to be biased towards the closed position.

6. The conveyor apparatus of claim 1, wherein the mounting bracket comprises a positioning element track groove embodying a slot provided along the mounting bracket in an at least substantially vertical direction, the positioning element track groove being configured to receive at least a portion of the positioning element therein and at least partially restrict the range of motion of the positioning element in one or more directions.

7. The conveyor apparatus of claim 6, wherein the first sidewall comprises a sidewall groove embodying a slot provided along the first sidewall in an at least substantially vertical direction, the sidewall groove being at least substantially aligned with the positioning element track groove and configured to receive at least a portion of the positioning element therein.

8. The conveyor apparatus of claim 1, wherein the bottom panel positioning assembly further comprises a user interface to receive one or more user inputs to selectively control a movement of bottom panel between the open and the closed position.

9. The conveyor apparatus of claim 1, wherein the bottom panel is configured for selective rotation about a lateral hinge axis defined in a lateral direction between the plurality of opposing sidewalls.

10. The conveyor apparatus of claim 1, wherein the bottom panel comprises a panel attachment element secured to a lateral frame element of the bottom panel in a position that is at least substantially aligned along a vertical axis with at least a portion of the positioning element when the bottom panel is in the closed position, the panel attachment element being configured for attachment to a panel connection element of the bottom panel positioning assembly.

11. A bottom panel positioning assembly comprising:
a mounting bracket configured for attachment to a first sidewall of a conveyor assembly;
a positioning element slidably engaged relative to the mounting bracket and configured to move throughout a range of motion between a nominal position and an engaged position; and
a linear actuator in electronic communication with a control device to facilitate selective extension and/or retraction of the linear actuator in order to cause a corresponding movement of the positioning element to the nominal position or the engaged position.

12. The bottom panel positioning assembly of claim 11, wherein the bottom panel positioning assembly is configured to facilitate selective movement of a bottom panel of the conveyor assembly between a closed and an open position.

13. The bottom panel positioning assembly of claim 11, wherein the bottom panel positioning assembly is operatively connected to a bottom panel based at least in part on a panel connection element that extends between the bottom panel and the positioning element.

14. The bottom panel positioning assembly of claim 11, wherein the bottom panel positioning assembly is configured such that the positioning element being positioned in the nominal position of the positioning element corresponds to a bottom panel being positioned in a closed position.

15. The bottom panel positioning assembly of claim 11, wherein the bottom panel positioning assembly further comprises a user interface to receive one or more user inputs to selectively control a movement of bottom panel between the open and a closed position.

16. The bottom panel positioning assembly of claim 11, wherein the bottom panel positioning assembly is operatively connected to a bottom panel such that the linear actuator engaged with the positioning element causes the bottom panel to be biased towards a closed position.

17. The bottom panel positioning assembly of claim 11, wherein the mounting bracket comprises a positioning element track groove embodying a slot provided along the mounting bracket in an at least substantially vertical direction, the positioning element track groove being configured to receive at least a portion of the positioning element therein and at least partially restrict the range of motion of the positioning element in one or more directions.

18. The bottom panel positioning assembly of claim 11, wherein the first sidewall comprises a sidewall groove embodying a slot provided along the first sidewall in an at least substantially vertical direction, the sidewall groove being at least substantially aligned with a positioning element track groove and configured to receive at least a portion of the positioning element therein.

19. The bottom panel positioning assembly of claim 11, wherein a bottom panel comprises a panel attachment element secured to a lateral frame element of the bottom panel in a position that is at least substantially aligned along a vertical axis with at least a portion of the positioning element when the bottom panel is in a closed position, the panel attachment element being configured for attachment to a panel connection element of the bottom panel positioning assembly.

\* \* \* \* \*